United States Patent [19]

Johary et al.

[11] Patent Number: 5,049,410

[45] Date of Patent: Sep. 17, 1991

[54] LUBRICANT FILM FOR A THIN-FILM DISK

[75] Inventors: Ajay Johary; Bruce E. Kennedy; James J. Mayerle; John C. S. Shen, all of Rochester, Minn.

[73] Assignee: International Business Machines Corporation, Armonk, N.Y.

[21] Appl. No.: 430,599

[22] Filed: Nov. 1, 1989

[51] Int. Cl.$^5$ ............................................. B05D 5/12
[52] U.S. Cl. ................................... 427/131; 427/130; 427/385.5
[58] Field of Search ............... 427/41, 131, 128, 130; 428/422, 695

[56] References Cited

U.S. PATENT DOCUMENTS

| | | | |
|---|---|---|---|
| 4,404,247 | 9/1983 | Dominguez-Burguette et al. | 427/131 |
| 4,446,193 | 5/1984 | Afzali-Ardakani et al. | 427/131 |
| 4,692,378 | 9/1987 | Ishihara et al. | 427/131 |
| 4,696,845 | 9/1987 | Yanagisawa | 427/131 |
| 4,787,942 | 11/1988 | Wray | 427/327 |
| 4,794,035 | 12/1988 | Ishihara et al. | 427/131 |
| 4,803,125 | 2/1989 | Takeuchi et al. | 427/131 |
| 4,816,334 | 3/1989 | Yokoyama et al. | 427/128 |
| 4,960,609 | 10/1990 | Homola et al. | 427/131 |
| 5,008,128 | 4/1991 | Kudo et al. | 427/130 |

*Primary Examiner*—Michael Lusignan
*Assistant Examiner*—Diana L. Dudash
*Attorney, Agent, or Firm*—Philip M. Kolehmainen; Robert W. Lahtinen; Bradley A. Forrest

[57] ABSTRACT

A lubricant film for a thin-film disk is disclosed. The lubricant film comprises a monolayer of fixed lubricant bonded to the surface of the thin-film disk and a mobile lubricant in contact with the layer of fixed lubricant. The monolayer of lubricant film is applied to the thin-film in a method comprising applying a lubricant composition to the surface of a thin-film disk, then heating the thin-film disk at a sufficient temperature for a sufficient time to bond or fix a portion of the lubricant composition to the disk; to evaporate a portion of the lubricant composition from the surface of the disk; and to dispose a portion of the lubricant composition as a mobile lubricant in contact with the fixed lubricant.

15 Claims, No Drawings

LUBRICANT FILM FOR A THIN-FILM DISK

FIELD OF THE INVENTION

The present invention relates to a method of lubricating a thin-film disk. More particularly, the present invention relates to a method of applying a monolayer lubricant film to a thin-film magnetic disk by applying a lubricant composition to the thin-film disk in a single dip process, then heating the thin-film disk. Heating the thin-film disk for a sufficient time at a sufficient temperature evaporates a portion of the lubricant composition from the thin-film disk, fixes a portion of the lubricant composition onto the thin-film disk and disposes a portion of the lubricant composition in contact with the fixed lubricant as a mobile lubricant. Accordingly, the method of the present invention provides a monolayer lubricant film for a thin-film disk, the lubricant film comprising (a) a fixed lubricant, from about 10 Å (Angstroms) to about 25 Å in thickness, bonded to the surface of the thin-film disk, and (b) a mobile lubricant, from about 5 Å to about 15 Å in thickness, disposed in contact with the fixed lubricant, with the fixed lubricant and the mobile lubricant having essentially the same chemical identity.

DESCRIPTION OF THE PRIOR ART

Magnetic disk units including magnetic disks with magnetizable media are used for data storage in computer systems. Deposited thin-film layers including a magnetic medium store data that is written and read by a magnetic head that rests on the disk in a static condition and slides across the disk surface to be lifted above the disk surface by the effect of trapped air when the disk is rotated or spun. To reduce wear and friction, the disk surface is typically lubricated.

Lubricants are applied to disks used in disk drive units having rotating magnetic disks to improve the surface friction properties of the disk. However, the prior art lubricants had disadvantages that limited their use or made the application of the lubricant to the disk difficult, time-consuming or impractical. For example, if a disk lubricant comprised only a fixed lubricant, such as a lubricant covalently bonded to the surface of the disk, normal use and wear eventually abraded the lubricant from the surface of the disk. In addition, if a disk lubricant comprised only a mobile lubricant, such as a nonbonded layer of lubricant applied to the surface of the disk, the lubricant was removed during cleaning of the disk and also continually was lost from the surface of the spinning disk by centrifugal migration. The centrifugal migration of lubricant from the disk leads to increased head to disk interference, and can cause a complete failure of the disk drive unit.

An example of a prior art attempt to provide a suitable disk lubricant is Pedrotty U.S. Pat. No 4,268,556 disclosing a series of highly polar lubricants that are resistant to solvents. Although the lubricants disclosed by Pedrotty were not removed from the disk during cleaning, many were poor lubricants. Afzali-Ardakani et al U.S. Pat. No. 4,446,193 disclosed applying a diazo compound to a disk surface, then heating the disk to form a carbene intermediate that bonded to the polymeric coatings or to the metal oxides of the magnetic disk. However, diazo compounds are toxic and highly unstable, therefore making both the manufacturing process and the resulting disk product potentially unsafe.

In order to achieve the benefits and eliminate the disadvantages of the individual fixed and mobile lubricants, investigators attempted to apply both a fixed lubricant and a mobile lubricant to the disk. The fixed and mobile lubricants, having different chemical identities, were applied to the disk individually as separate layers in a two-step process. In addition, the expected advantages of such a lubricant composition were not completely realized. For example, Janssen et al, in U.S. Pat. No 4,642,246, disclosed a two-step method of applying a lubricant to a magnetic disk including first chemically-bonding a functionalized polymeric lubricant to the disk, then applying a nonbonded, mobile lubricant over the chemically bonded lubricant. Janssen et al disclosed that the mobile lubricant can be a functionalized lubricant that reacts with the residual functional units of the polymeric lubricant, or the mobile lubricant can be a nonfunctionalized lubricant. Janssen et al utilized a carboxy-terminated perfluorinated polyether as the functionalized polymeric lubricant; an aziridine or an epoxide compound as the functionalized mobile lubricant; and a perfluorinated polyether as the nonfunctionalized mobile lubricant. The method of Janssen et al is a two-step process requiring several manipulative steps and an extended time period to apply the two different lubricants to the magnetic disk.

M. Barlow et al, in the publication, "Duplex Reactive Fluorocarbon Films with Spin-Off Resistant Characteristics", *IEEE TRANSACTIONS ON MAGNETICS*, Vol. Mag-23, No. 1, pp. 33–35 (1987), disclosed the use of two fluorocarbon films, one film bonded chemically and permanently to the disk surface and the other film overcoated on the chemically-bonded film, to lubricate the disk and to reduce lubricant loss by centrifugal migration. Barlow et al used a two-step process including first coating the disk with a functionalized perfluorinated polyether, and then coating the first lubricant layer with a nonfunctionalized perfluorinated polyether to provide two fluorocarbon lubricant layers having different chemical identities. The chemically different perfluorinated polyethers were applied to the disk, at a total thickness of about 100 Å, in a two-step application, without any further processing, such as heating.

In addition, other investigators have attempted to overcome the loss of mobile lubricant through centrifugal migration by incorporating the mobile lubricant as a component into a coating formulation; by modifying the lubricant coating to increase its internal porosity; or by treatment of the disk to increase surface roughness. In these attempts, excess mobile lubricant migrates to the surface of the disk from voids or micropores to replenish the mobile lubricant lost because of centrifugal migration. The ability of the disk surface or disk coating to internally hold the excess mobile lubricant is useful, but these methods have become increasingly unattractive as present-day technology has required that the thickness of the coating be minimized. In addition, lubricant coatings of this type have adversely affected electromagnetic performance.

Present-day technology requires a thin lubricant film on the disk. Therefore, in order to maximize disk performance, a need exists for as thin a mobile lubricant layer, and as thin a fixed lubricant layer, as possible. Accordingly, a thin lubricant film, such as a film less than about 50 Å in total thickness, including both a fixed lubricant and a mobile lubricant that resists centrifugal migration of the mobile lubricant from the disk would be an important improvement in the art of thin-film disk lubricants. Accordingly, the present invention is directed to a monolayer lubricant film for a thin-film disk, that is less than about 50 Å total in thickness, that comprises a fixed lubricant and a mobile lubricant of essentially the same chemical identity, and that is applied in a fast and simple single dipping process. It is both surprising and unexpected, and neither taught nor suggested in the prior art, that the fixed lubricant and the mobile lubricant have essentially the same chemical identity.

SUMMARY OF THE INVENTION

The present invention is directed to a monolayer lubricant film for a thin-film disk comprising a fixed lubricant and a mobile lubricant having essentially the same chemical identity. In particular, the present invention is directed to a lubricant film for a thin-film disk, and to a method of applying the lubricant film to a thin-film disk, wherein the lubricant film comprises a fixed lubricant of from about 10 Å to about 25 Å in thickness and a mobile lubricant, having essentially the same chemical identity as the fixed lubricant, of from about 5 Å to about 15 Å in thickness. The lubricant film includes a single layer of a perfluorinated compound, applied to the thin-film disk in a single dipping process.

Accordingly, it is an object of the present invention to provide a monolayer lubricant film for a thin-film disk comprising a fixed lubricant and a mobile lubricant of essentially the same chemical identity.

It is another object of the present invention to provide a monolayer lubricant film for a thin-film disk including a fixed lubricant and a mobile lubricant, and having a total thickness of less than about 50 Å.

Another object of the present invention is to provide a lubricant film for a thin-film disk having a ratio of thickness of fixed lubricant to thickness of mobile lubricant of from about 5 to 1 to about 1 to 1.

Another object of the present invention is to provide a lubricant for a thin-film disk having a fixed lubricant component of from about 10 Å to about 25 Å in thickness and a mobile lubricant component of from about 5 Å to about 15 Å in thickness, with the fixed lubricant and the mobile lubricant having essentially the same chemical identity.

Another object of the present invention is to provide a lubricant film for a thin-film disk including a fixed lubricant and a mobile lubricant, and comprising either a functionalized perhalogenated compound or a nonfunctionalized perhalogenated compound.

Still another object of the present invention is to provide a method of lubricating a thin-film disk comprising applying a lubricant composition, including a lubricant and a suitable liquid carrier, to the surface of the thin-film disk, then heating the thin-film disk for a sufficient time and at a sufficient temperature, such as for about from one hour to about two hours at from about 100° C. to about 200° C., to fix a portion of the lubricant composition onto the surface of the thin-film disk; to evaporate a portion of the lubricant composition from the surface of the disk; and to dispose a portion of the lubricant composition as a mobile lubricant in contact with the fixed lubricant.

The above and other objects and advantages of the present invention will become apparent from the following detailed description of the invention.

DETAILED DESCRIPTION OF THE INVENTION

The ideal lubricant for a thin-film disk possesses the properties of both a fixed lubricant and mobile lubricant. Accordingly, when the fixed lubricant is lost from the disk during use, the mobile lubricant can creep along the disk surface to replace the fixed lubricant lost by wear or abrasion. Consequently, the mobile lubricant must resist centrifugal migration from the disk, such that the mobile lubricant is available to replace the fixed lubricant when needed, possibly years after the disk is put into operation.

Perhalogenated compounds, and especially perfluorinated compounds, are known as useful lubricants for thin-film disks. The perfluorinated compounds possess properties advantageous for this use, including such properties as. chemical inertness, environmental stability, low surface tension, moisture repellency, good lubricity, low volatility and availability in a variety of chemical types. For example, perfluoropolyethers are commercially available in a variety of molecular weight ranges as nonfunctionalized and as functionalized compounds and polymers. Nonfunctionalized perfluoropolyether polymers include linear chain and branched chain polymers as depicted in general structural formulas (I) and (II), wherein m and n are numerals ranging from one to about 20. Examples of nonfunctionalized perfluoropolyether compounds include the FOMBLIN AM Series available commercially from Italian Montedison.

Functionalized perfluoropolyether polymers are depicted in general structural formula (III), wherein y and z are numerals ranging from one to about 20, and X is selected from the group consisting of $-CO_2R$, wherein R is an alkyl group including from one to about ten carbon atoms; $-CO_2H$; $-OH$; $-NCO$; and combinations thereof. Examples of functionalized perfluoropolyethers include FOMBLIN Z DEAL ($X=-CO_2CH_3$); FOMBLIN Z DIAC ($X=-CO_2H$); FOMBLIN Z DOL ($X=-OH$); and FOMBLIN DISOC ($X_2=-NCO$); available commercially from Italian Montedison. It should be understood that the functionalized and nonfunctionalized perfluoropolyethers as depicted in general structural formulas (I), (II) and (III) also can include an aromatic ring, an alkylene group, a cycloalkylene group, and like substituents in their molecular structure.

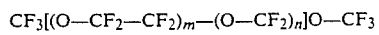

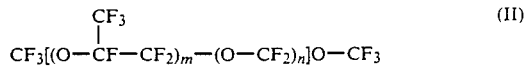

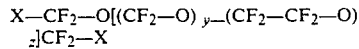

The functionalized perfluoropolyethers of general structural formula (III) have been used as a fixed lubricant on the surface of a thin-film disk. The functional groups of the perfluoropolyethers of general structural formula (III) interact with the metal oxide, the polymeric coating or another component of the thin-film disk that can fix the lubricant onto the disk. A disk having only a covalently-bonded, fixed lubricant can exhibit good frictional properties, but wear characteristics of the lubricant generally are poor because the fixed lubricant, once worn from a particular location on the disk, is not replaced with a mobile lubricant. Furthermore, incorporating only a fixed lubricant having functional groups, such as those disclosed by Pedrotty in U.S. Pat. No. 4,268,556, onto the surface of a thin-film disk provides a lubricant having relatively poor surface friction properties.

The nonfunctionalized perfluoropolyethers of general structural formulas (I) and (II) have been used as a mobile lubricant on the surface of a thin-film disk. These non-functionalized compounds overcome the disadvantages associated with fixed lubricants derived from the functionalized compounds, but exhibit the disadvantages of removal by solvent during disk cleaning and centrifugal migration from a spinning disk. Accordingly, investigators attempted to provide the benefits and eliminate the disadvantages of both a fixed lubricant and a mobile lubricant by including both types of lubricants on a thin-film disk.

The prior art teaches that first a functionalized lubricant is fixed onto the surface of the thin-film disk, then a nonfunctionalized lubricant is applied over the fixed lubricant to serve as a mobile lubricant. In addition some investigators have reacted the residual functional units of the fixed lubricant with a second functionalized compound to provide a mobile lubricant for the thin-film disk. However, in every case, the prior art describes the combination of a fixed lubricant and a mobile lubricant for a thin-film disk as comprising lubricants of two separate chemical identities.

Surprisingly and unexpectedly, it has been found that a monolayer lubricant film, comprising a fixed lubricant and a mobile lubricant having essentially the same chemical identity, can be applied to a thin-film disk in a single dipping process. In general, it has been found that applying a lubricant composition, comprising a perfluorinated lubricant and a suitable liquid carrier, to a thin-film disk, followed by heating the disk for a sufficient time and at a sufficient temperature fixes a portion of the perfluorinated lubricant onto the surface of the disk to provide a fixed lubricant and disposes a portion of the perfluorinated lubricant in contact with the fixed lubricant layer to provide a mobile lubricant. The volatile fraction of the perfluorinated lubricant, having a greater tendency to centrifugally migrate from a spinning disk, is evaporated from the disk during the heating process.

Accordingly, the thin-film disk is lubricated by a monolayer thin film, i.e., less than about 50 Å in total thickness, of a perfluorinated lubricant, comprising a fixed lubricant and a mobile lubricant, wherein the fixed lubricant and the mobile lubricant have essentially identical chemical identities. In essence, the only difference in chemical identity between the fixed lubricant and the mobile lubricant may be a potentially different molecular weight distribution of the perfluorinated lubricant comprising the fixed lubricant from the molecular weight distribution of the perfluorinated lubricant comprising the mobile lubricant. In addition, the ratio of thickness of the fixed lubricant to mobile lubricant is in the range of from about 1 to 1 to about 5 to 1, and the mobile lubricant effectively resists centrifugal migration.

In particular, and as will be discussed more fully hereinafter, a lubricant composition first is applied to a thin-film disk. The lubricant composition comprises a perfluorinated lubricant having the general structural formula (I), (II), (III) or, to achieve the full advantage, (IV), and a suitable liquid carrier vehicle. In accordance with an important feature of the present invention, the perfluorinated lubricant can be a functionalized compound or a nonfunctionalized compound because either type of compound is capable of sufficiently interacting, upon heating, with the surface of the thin-film disk to provide a fixed lubricant layer.

It has been found that a nonfunctionalized perfluorinated compound of general structural formula (I) or (II), having an average molecular weight in the range of from about 500 to about 10,000 is useful in the method of the present invention. A preferred perfluorinated lubricant is a functionalized compound, depicted by general structural formula (III), having an average molecular weight in the range of from about 1000 to about 5000. An especially preferred perfluorinated lubricant is a functionalized compound depicted by general structural formula (IV) wherein s and t are numerals ranging from one to about 20, r is a numeral from one to about 8, and X is selected from the group consisting of —$CO_2R$, wherein R is an alkyl group including from one to about ten carbon atoms; —$CO_2H$; —OH; —NCO; and combinations thereof, and having an average molecular weight in the range of from about 1000 to about 5000. It has been found that compounds of general structural formula (IV) are fixed more effectively to the surface of the thin-film disk by the alkylene groups adjacent to the terminal functionalities of the molecule.

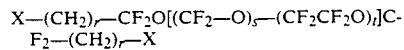

$$X-(CH_2)_r-CF_2O[(CF_2-O)_s-(CF_2CF_2O)_t]CF_2-(CH_2)_r-X$$

A functionalized perfluorinated compound of general structural formula (III) or (IV) also is preferred because such compounds demonstrate sufficient lubricating properties in addition to being easily fixed onto the surface of the thin-film disk than the nonfunctionalized perfluorinated compounds of general structural formula (I) or (II). However, certain functional groups present on the functionalized perfluorinated compound, such as carboxyl groups (—$CO_2H$), can promote corrosion of the thin-film disk. Consequently, the density of such functional groups per molecule of perfluorinated compound, or the density of such functional groups remaining unreacted on the surface of the thin-film disk, should be minimized. Accordingly, to achieve the full advantage of the present invention, it has been found that the perfluorinated lubricant is a functionalized compound of general structural formula (IV), having an average molecular weight of from about 2000 to about 4000, and wherein X is OH (hydroxyl). It has been found that a hydroxyl-containing perfluoropolyether sufficiently interacts with the surface of the thin-film disk to provide a fixed lubricant component of from about 10 Å to about 25 Å in thickness and does not promote corrosion of the disk. The physical and chemical properties of a hydroxyl-containing perfluoropolyether of general structural formula (III), like FOMBLIN Z DOL, are intermediate to the physical and chemical properties of a nonfunctional perfluoropolyether, and to the physical and chemical properties of a highly-functional perfluoropolyether like the carboxyl-substituted perfluoropolyether FOMBLIN Z DIAC.

The perfluorinated lubricant generally is present in the lubricant composition in an amount ranging from about 0.1% to about 10%, and preferably in an amount ranging from about 0.2% to about 5%, by weight of the lubricant composition. In addition to the perfluorinated lubricant, the lubricant composition also includes a suitable liquid carrier. The liquid carrier is present in the lubricant composition in an amount up to about 99.9% by weight of the lubricant composition, and preferably is present in an amount of from about 85% to about 99% by weight of the lubricant composition.

In general, the liquid carrier is selected from the perhalogenated solvents, like the perfluorinated solvents and the perfluorochloroalkane solvents. Such perhalogenated solvents are capable of sufficiently solubilizing the perfluorinated lubricant, and solvent residues are easily removed from the surface of the thin-film disk upon heating. It should be understood that the perfluorinated lubricants have limited solubility in most organic solvents. However, any organic solvent capable of solubilizing the perfluorinated lubricant, that is inert with respect to the perfluorinated lubricant, and that can be essentially completely removed from the thin-film disk upon heating is useful in the method of the present invention. Furthermore, other optional ingredients, that do not adversely affect the ability of perfluorinated lubricant to lubricate the thin-film disk, also can be included in the lubricant composition.

After preparing the lubricant composition by homogeneously admixing the perfluorinated lubricant, the liquid carrier and any optional ingredients, the lubricant composition can be applied to the thin-film disk in accordance with methods well known in the art, such as spraying, dipping or coating the lubricant composition onto the surface of the thin-film disk. However, prior to heating the thin-film disk coated with the lubricant composition, it is preferred that the lubricant composition is applied as coating of essentially uniform thickness of no greater than about 100 Å, and to achieve the full advantage of the present invention of uniform thickness no greater than about 80 Å, by a single dipping process in order to ultimately provide a final monolayer lubricant film having a total thickness of less than about 50 Å.

It is important to provide a uniform coating of lubricant composition of less than about 100 Å on the surface of the thin-film disk for two reasons. First, when the lubricant composition is applied to the surface as an extremely thin layer, preferably no greater than about 80 Å, then, after heating, no more than about 10 Å to about 20 Å of a mobile lubricant component remains on the disk surface. It has been found that if the thickness of the mobile lubricant is greater than about 10 Å to about 20 Å, then static friction between the disk and the magnetic head becomes unacceptably high. Second, if the thickness of the lubricant composition applied to the disk surface is uniform over the entire disk area, then localized areas of high lubricant composition thickness are eliminated. Localized areas of high lubricant composition thickness can cause erratic and high static friction, and therefore are unacceptable. In general, the thickness of the lubricant composition applied to the disk surface should be sufficiently uniform that the standard deviation of total lubricant composition thickness across the disk surface is less than about plus or minus 5 Å. Consequently, after heating, the standard deviation of the mobile lubricant layer therefore is about plus or minus 1.5 Å across the entire disk surface.

To achieve a uniform application of the lubricant composition onto the disk surface, at a thickness no greater than about 100 Å, and preferably no greater than about 80 Å, a single dip method of applying the lubricant composition to the disk surface is preferred. Other methods of lubricant composition application to the disk, such as the prior art spray-wipe process, can be used, but do not provide as uniform a thickness of lubricant composition on the disk as the single dip method.

In the dip method, a perfluorinated lubricant first is dissolved in a suitable liquid carrier. A suitable liquid carrier includes the perhalogenated alkanes, such as FREON TF, available from DuPont Inc., Wilmington, Del., and FG 72, available from 3M Co., Minneapolis, Minn. In general, the concentration of the perfluorinated lubricant in liquid carrier is in the range of from about 0.1% to about 10%, and preferably from about 0.2% to about 5%, by weight of the lubricant composition. The lubricant composition is placed in a vessel, like a bath, and a thin-film disk is dipped, vertically, into the bath. For example, an entire thin-film disk was dipped in the bath, then the disk slowly was removed from the bath at a steady rate, such as a rate of from about 1 mm/sec (millimeter per second) to about 3 mm/sec. The disk was maintained in a vertical position while being pulled from the bath. A film of the lubricant composition was formed on the surface of the disk immediately above the level of the lubricant composition in the bath. Any excess lubricant composition flows down the vertical disk into the bath, and a lubricant film of uniform thickness is retained on the disk.

The thickness of the layer of lubricant composition on the surface of the disk is determined by the concentration of perfluorinated lubricant in the lubricant composition and by the rate of removal of the disk from the bath. For example, for a lubricant composition including the lubricant FOMBLIN Z DOL and the carrier liquid FREON TF including 10 grams of FOMBLIN Z DOL per liter of lubricant composition, and removing the disk from the bath at a rate of about 1.6 mm/sec., the thickness of lubricant composition on the disk was about 80 Å. The exact thickness of the lubricant composition on the disk also depends, to some extent, upon the properties of the disk surface material, such as surface activation and porosity.

To achieve a uniform layer of lubricant composition on the thin-film disk the carrier liquid should possess properties including a sufficient volatility at room temperature, an ability to wet the surface of the disk, a low surface tension, and a low viscosity. In addition, air currents near the bath should be essentially eliminated in order to allow uniform liquid carrier evaporation, and therefore to provide a lubricant film of uniform thickness. Furthermore, waves, ripples and vibrations in the bath should be eliminated, and the lubricant composition should not be allowed to drip down the surface of the thin-film disk. Such physical effects produce a nonuniform layer thickness of lubricant composition on the thin-film disk. Furthermore, to achieve a lubricant film of uniform thickness, the disk should be dipped into the lubricant composition for a sufficiently long period to completely wet the entire disk surface and all contaminants, dissolved or particulate, should be excluded from the bath holding the lubricant composition.

Then, after applying a uniform film of the lubricant composition to the thin-film disk, the disk is heated at a sufficient temperature, such as from about 100° C. to about 200° C., for a sufficient time, such as from about one hour to about two hours, to evaporate the remaining liquid carrier and the volatile components of the perfluorinated lubricant, and to permit a portion of the nonvolatile components of the perfluorinated lubricant to interact with, and become fixed upon, the surface of the thin-film disk. The remaining portion of the nonvolatile components of the perfluorinated lubricant, having essentially the same chemical identity as the fixed lubricant layer, remains unfixed on the thin-film disk to serve as a mobile lubricant. It has been found that this mobile lubricant effectively resists centrifugal migration from a spinning disk.

It should be understood that a thin-film disk, having a lubricant composition applied thereon can be heated at a temperature less than about 100° C. for a time period greater than about from one hour to two hours, or at a temperature greater than about 200° C. for a time period less than about from one hour to two hours, as long as the ratio of the thickness of the fixed lubricant to the thickness of the mobile lubricant is in the range of from about 1 to 1 to about 5 to 1. It has been found that, if the temperature is too low and/or the heating time is too short, then the thickness of the mobile lubricant is too great, i.e., an insufficient amount of the perfluorinated lubricant has been fixed onto the disk surface and/or evaporated to from the disk surface, and static friction becomes unacceptably high. Conversely, if the heating temperature is too high and/or the heating time is too long, then the thickness of the mobile lubricant is too small, i.e, an excessive amount of the perfluorinated lubricant has been fixed onto the disk surface and/or evaporated from the disk surface and the lubricant then wears from the disk surface too quickly. Accordingly, it has been found that to achieve the full advantage of the present invention, after applying a uniform layer of the lubricant composition to the surface of the disk by a single dipping process, the disk is heated at from about 125° C. to about 175° C. for about one hour to about two hours to achieve the correct ratio of thickness of fixed lubricant to thickness of mobile lubricant.

Accordingly, the method of the present invention fixes, or bonds, a perfluorinated lubricant to the surface of a thin-film disk, such as a carbon or carbon based overcoat surface. The fixed lubricant contributes to the disk durability without demonstrating the unacceptably high static friction resulting when the thickness of the mobile lubricant approximates the thickness of the fixed lubricant. The improved properties demonstrated by the lubricant of the present invention are extremely useful in thin-film recording in combination with a thin-film means, for example, having a 10 microinch thickness and 3000 to 4000 RPM spinning rates. The mechanics of such a combination are extremely stressed thereby making the lubricant critical to high performance. Accordingly, the present high performance lubricant is especially useful for high recording rates at low heat disk interactions.

In addition, and in accordance with the method of the present invention, the volatility of the mobile lubricant remaining on the disk surface after the heating cycle is reduced, thus increasing the useful life of the mobile lubricant on the disk. The centrifugal migration of the mobile perfluorinated lubricant also is reduced because the more volatile, low molecular weight fraction of the perfluorinated lubricant is removed by the heating process, and the lubricant remaining on the disk surface is less prone to centrifugal migration from a spinning sick. Furthermore, the method of the present invention involves a single dipping process to apply a lubricant comprising a fixed and a mobile lubricant component to the surface of the thin-film disk as opposed to the two-step prior art method of applying the separate and distinct fixed and the mobile lubricant layers in sequence.

Therefore, in accordance with an important feature of the present invention, the method optimizes the thickness of the lubricant layer by applying a uniform layer of lubricant composition to the surface of a thin-film disk in a single dip process, followed by a thermal curing cycle of the lubricant composition applied to the surface of the disk. In contrast to the prior art, the use of thermal cure to improve the long-term lubrication of thin-film disk with a monolayer of a fixed and a mobile perfluorinated lubricant, of essentially the same chemical identity, is both new and unexpected in the art.

It should be understood that the present disclosure had been made only by way of preferred embodiment and that numerous changes in details of construction, combination and arrangement of parts may be resorted to without departing from the spirit and scope of the invention as hereunder claimed.

We claim:

1. A method of lubricating a thin-film disk with a single lubricant layer including a fixed lubricant component and a mobile lubricant component in contact with the fixed lubricant component, wherein the lubricant layer has a total thickness of less than about 50 Å and the fixed lubricant component and the mobile lubricant component have the same chemical identity, comprising contacting the thin-film disk with a lubricant composition, comprising a lubricant and a liquid carrier, then heating the thin-film disk coated with the lubricant composition at a sufficient temperature for a sufficient time to essentially fix only the fixed lubricant component to the surface of the thin-film disk with the mobile lubricant component in contact with the fixed lubricant component.

2. The method of claim 1 wherein the ratio of the thickness of the fixed lubricant component to the thickness of the mobile lubricant component is in the range of from about 1 to 1 to about 5 to 1.

3. The method of claim 1 wherein the fixed lubricant component has a thickness of from 10 Å to about 25 Å and the mobile lubricant component has a thickness of from about 5 Å to about 15 Å.

4. The method of claim 1 wherein the lubricant composition includes from about 0.1% to about 10% by weight of a perfluorinated lubricant.

5. The method of claim 1 wherein the lubricant composition includes from about 0.2% to about 5% by weight of a perfluorinated lubricant.

6. The method of claim 1 wherein the lubricant in the lubricant composition is a perfluorinated lubricant.

7. The method of claim 6 wherein the lubricant in the lubricant composition is a functionalized perfluorinated lubricant or a nonfunctionalized perfluorinated lubricant.

8. The method of claim 7 wherein the nonfunctionalized perfluorinated lubricant is a compound having the formula

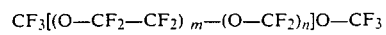

or

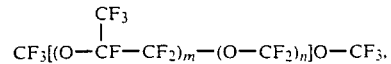

wherein m and n are numerals ranging from 1 to about 20.

9. The method of claim 8 wherein the functionalized perfluorinated lubricant is a compound having the formula $$X-CF_2-O[(CF_2-O)_y-(CF_2-CF_2-O)_z]CF_2-X,$$

wherein y and z are numerals ranging from one to about 20, and X is selected from the group consisting of $-CO_2R$, wherein R is an alkyl group including from one to about ten carbon atoms; $-CO_2H$; $-OH$; $-NCO$; and combinations thereof.

10. The method of claim 8 wherein the functionalized perfluorinated lubricant is a compound having the formula $$X-(CH_2)_r-CF_2O[(CF_2-O)_s-(CF_2CF_2O)_t]CF_2-(CH_2)_r-X,$$

wherein s and t are numerals ranging from one to about 20, r is a numeral ranging from one to about eight and X is selected from the group consisting of $-CO_2R$, wherein R is an alkyl group including from one to about ten carbon atoms; $-CO_2H$; $-OH$; $-NCO$; and combinations thereof.

11. The method of claim 1 wherein the suitable liquid carrier is a perfluorinated solvent.

12. The method of claim 6 wherein the perfluorinated lubricant has an average molecular weight in the range of from about 500 to about 10,000.

13. The method of claim 6 wherein the perfluorinated lubricant has an average molecular weight in the range of from about 1000 to about 5000.

14. The method of claim 6 wherein the perfluorinated lubricant has an average molecular weight in the range of from about 2000 to about 4000.

15. The method of claim 1 wherein the thin-film disk is heated at a temperature in the range of from about 100° C. to about 200° C. for a time of from about one hour to about two hours.

* * * * *